Dec. 26, 1944.   E. W. McKINNEY   2,366,045
SLOTTING MACHINE
Filed June 20, 1941   4 Sheets-Sheet 3
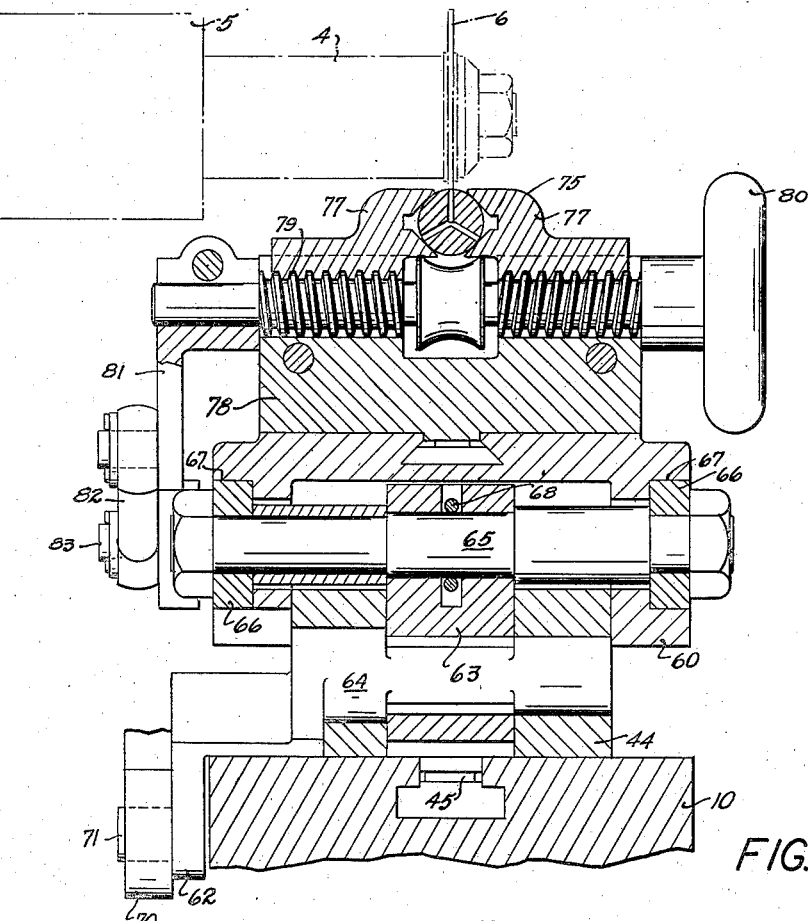
FIG.6
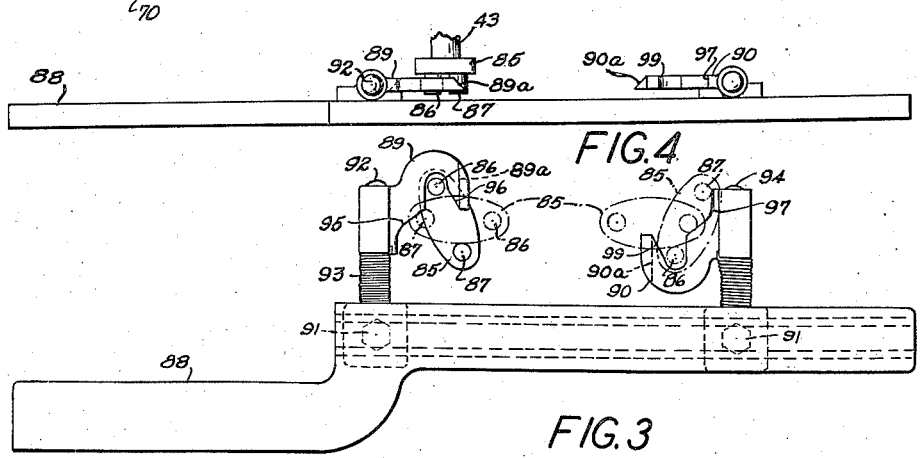
FIG.4
FIG.3
INVENTOR.
ELSMERE W. McKINNEY
BY
John H. Lemon
HIS   ATTORNEY Patented Dec. 26, 1944

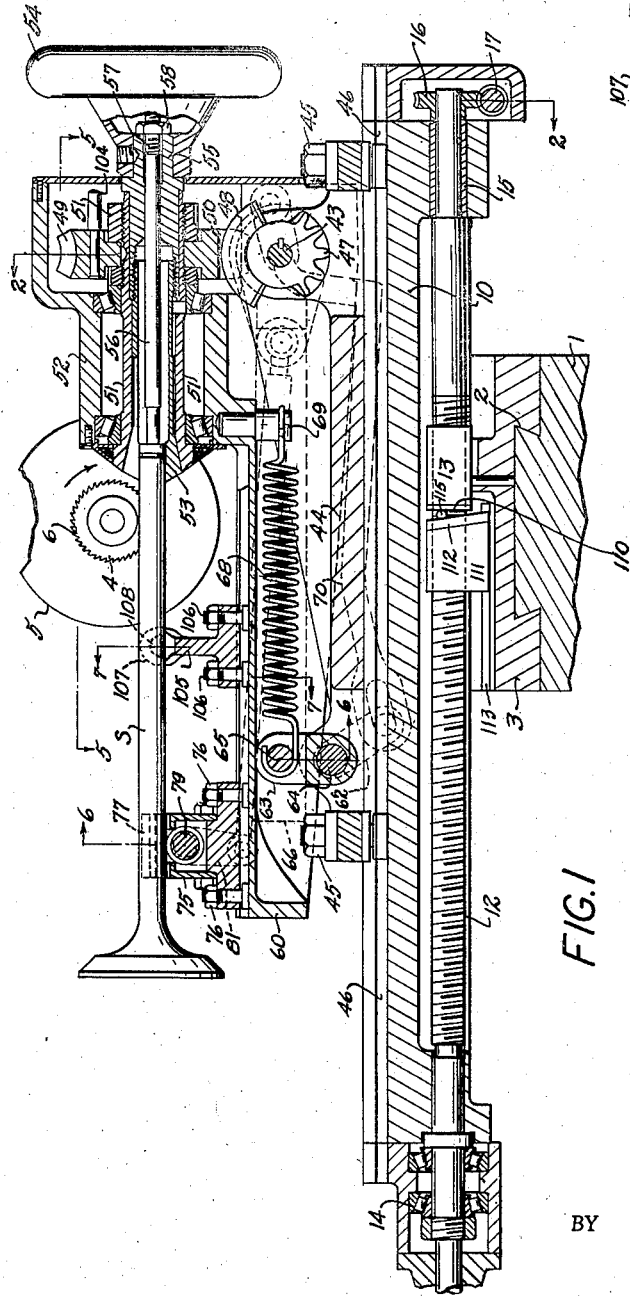

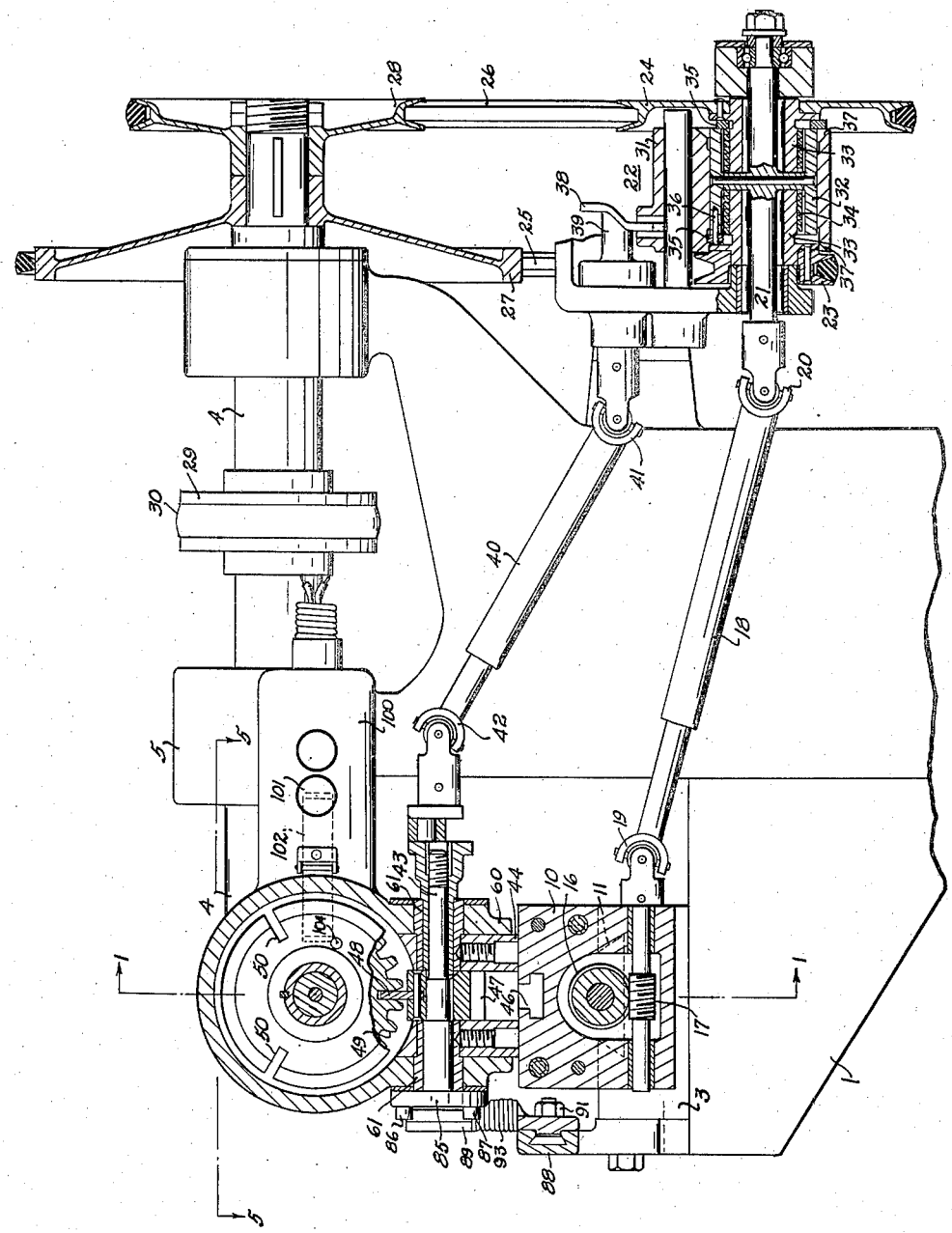

2,366,045

UNITED STATES PATENT OFFICE 2,366,045

SLOTTING MACHINE

Elsmere W. McKinney, Cleveland Heights, Ohio, assignor to William H. Taylor, Mentor-on-the-Lake, Ohio, as trustee Application June 20, 1941, Serial No. 398,991

20 Claims. (Cl. 90—58)

This invention relates to an apparatus for cutting slots, keyways, flats, and the like, in articles, and particularly to an apparatus for cutting longitudinal slots in the stems of poppet valves and cylindrical articles.

For purposes of illustration, the apparatus is described hereinafter specifically in connection with the slotting of poppet valve stems, the use and application of the apparatus as a whole and of specific sub-combinations thereof in connection with other apparatus and for other purposes being readily apparent from the exemplary disclosure. Likewise, for illustrative purposes, the embodiment of the invention in which the valve is fed to a rotating cutter which remains in fixed position is disclosed, it being understood that the cutter could be fed to the valve, if desired.

One of the principal objects of the present invention is to provide a simple and compact apparatus which, when the valve is inserted and the machine started automatically, first moves the valve to sink the cutting tool therein to the desired depth, then feeds the valve endwise on the cutting stroke for cutting a slot of the length and depth desired, next stops the endwise travel and moves the valve out of engagement with the cutter, then returns the valve endwise to starting position while partially indexing the valve by rotating it about its axis a portion of the total indexed angle required for location of the next slot, then again moving the valve toward the cutter and concurrently rotating it through the remainder of the total indexed angle for causing the slot to be properly spaced circumferentially from the preceding slot, and continuing the feed to sink the cutter and repeat the operation until the required number of slots are cut, then automatically stopping the machine in proper position to remove the slotted valve and to insert a valve to be slotted.

Another object is to provide in an apparatus of the character described a means effecting rapid feed longitudinally of the valve stem during the cutting operation and for effecting several times more rapid return of the valve in the opposite or return direction.

Another object is to provide a simple and effective indexing means which, by the use of interchangeable indexing gears, readily removable and applicable, can be set to cut any preselected number of slots which are circumferentially spaced from each other around the axis of the stem a predetermined distance apart.

Another object is to provide a simple and effective means for permitting insertion and removal of the valve from the apparatus yet which, after simply placing the valve in position, grips and firmly holds the valve so that accuracy in length and depth of slots and in their circumferential spacing are assured.

Other objects and advantages will become apparent from the following specification wherein reference is made to the drawings in which:

Fig. 1 is a vertical longitudinal sectional view through the apparatus of the present invention and is taken on line 1—1 in Fig. 2;

Fig. 2 is a vertical cross sectional view taken on line 2—2 in Fig. 1;

Fig. 3 is a side elevation of the controlling cams of the apparatus;

Fig. 4 is a top plan view of the cams of Fig. 3;

Fig. 5 is a fragmentary top plan view of the apparatus as viewed from the line 5—5 in Figs. 1 and 2;

Fig. 6 is an enlarged cross sectional view taken on a plane indicated by the line 6—6 in Fig. 1;

Fig. 7 is a cross sectional view of the work rest taken on a plane indicated by the line 7—7 in Fig. 1.

Figure 8:
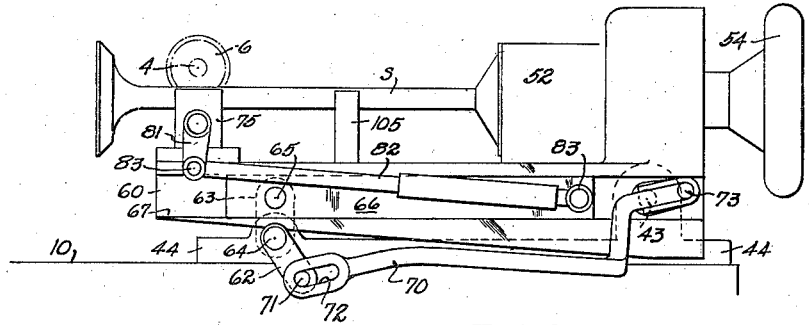
Figs. 8, 9 and 10 are diagrammatic representations of the three operating positions of the apparatus, Fig. 8 showing the position at the start of the cut, Fig. 9 showing the position at the end of the cut, and Fig. 10 showing the position at the beginning of the return operation.
Figure 9:
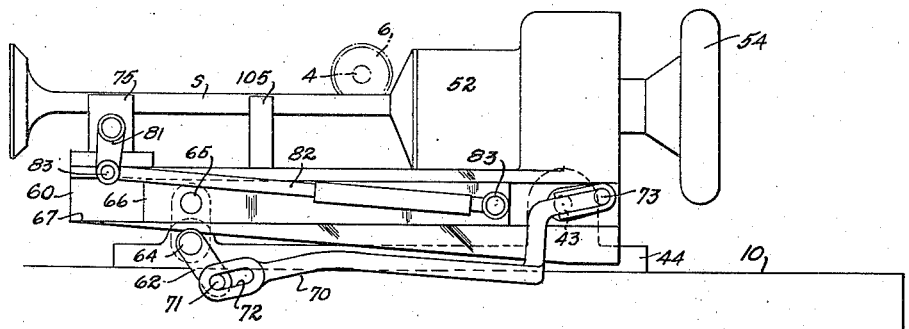
Figure 10:
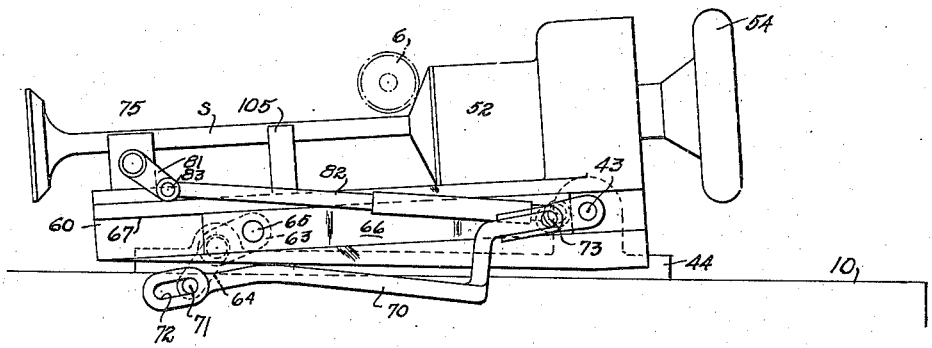

The apparatus with which the invention is particularly concerned is mounted on the base and standard of a suitable type of milling machine, having the usual table 1 which is adjustable vertically in suitable guideways and has a horizontal guideway 2 extending parallel to the spindle axis and on which a table 3 is supported for movement forwardly and rearwardly.

The spindle 4 of the milling machine is mounted in antifriction bearings in a suitable housing 5 rigid with the frame of the machine. The spindle 4 carries a suitable toothed milling cutter 6 of the desired width or, if desired, a high speed abrasive cutting disc. For purposes of illustration a single cutter spindle is shown, but it is apparent that by duplication of portions of the present apparatus, a multiple cutter spindle may be used to increase the capacity.

Due to the mounting of the table 1 for vertical adjustment and the table 3 for horizontal adjustment parallel to the axis of the spindle 4, any desired depth of cut and position of cut forwardly and rearwardly of the machine can be predetermined and set accurately. In the following description this setting is such that the cutter cuts to a depth slightly below the axis of the article and on the diameter.

The apparatus with which the present invention is particularly concerned comprises a table 10 mounted in suitable guideways 11 on the table 3 for movement horizontally in a direction at right angles to the axis of the spindle 4. The table 10 carries a feed screw 12 which is in threaded engagement with a stationary internally threaded collar 13 on the table 3, the collar 13 being modified in a manner to form a part of a slack eliminator, later to be described.

The feed screw 12 extends the length of the table 10 and is mounted at one end in antifriction axial thrust bearings 14 and, at the opposite end, in a suitable bronze bushing 15. The feed screw 12 carries a gear 16 which is continuously in engagement with a rotatable worm gear 17 which is mounted in the table 10 for travel therewith. The gear 17 is driven through an extensible shaft 18 connected by a universal joint 19 to the shaft of the worm gear 17 and connected at its opposite end by the universal connection 20 to the driven shaft 21 of a reversible clutch which is designated generally at 22.

In the form illustrated, the clutch is one of the well known type having at one end a high speed driven pulley 23 and at the opposite end a low speed driven pulley 24. The pulleys 23 and 24 are connected by belts 25 and 26 to a high speed driving pulley 27 and a low speed driving pulley 28, respectively. The pulleys 27 and 28 are continuously driven and, for economy and maintaining an accurate timed relation with the spindle 4, are keyed to the spindle for rotation therewith.

The spindle, in turn, is driven by a pulley 29 connected by a belt 30 to a suitable electric motor or other source of power, (not shown). Thus when the pulleys 27 and 23 are cooperating, the table is driven at high speed on the return stroke which is from left to right in Fig. 1, and when the pulleys 28 and 24 are cooperating, the table is driven at low speed on the feed stroke which is from right to left in Fig. 1. The belt on one set of the pulleys is crossed so that the shaft 21 is driven in reverse directions depending upon the pulley of the clutch which is drivingly engaged. The low speed feed is for cutting and the high speed feed is for return of the table 10 to starting position.

The clutch 22 comprises generally a housing 31 which is shiftable axially of the shaft 21 on a barrel 32 which is rotatable relative to the housing 31. The barrel 32 is mounted in coaxial relation with a pair of sleeves 33 between which and the shaft 21 suitable roller bearings are provided. The sleeves 33 are arranged in end to end spaced relation. Between the barrel 32 and each sleeve 33 is a helical clutch spring 34. Since both springs and cooperating sleeves are alike in form and function, only the left hand spring in Fig. 2 is described in detail.

The left hand spring is connected at one end for rotation with the left hand sleeve 33 and its other end extends slightly beyond the barrel 32. A clutch ring 35 is connected by a suitable pin 36 to the barrel 32. The ring 35 lies in a suitable groove between the left hand end of the barrel 32 and a flange on the left hand sleeve 33 and has an internal radial notch disposed slightly off a diameter taken through the pin 36. Thus, as the housing 31 shifts to the left, its cam surface 37 swings the ring 35 into a position in which it engages the free end of the spring 34, thus connecting that end of the spring to the barrel 32 which is always connected for rotation to the shaft 21. Thus the shaft 21 is driven through the barrel 32, the pin 36, the ring 35, spring 34, and sleeve 33, and its associated pulley 23. By shifting the housing 31 axially of the shaft 21, driving cooperation between the shaft 21 and the pulleys 23 and 24 can be effected, selectively.

Obviously the feed and return of the table 10 must be in accurately timed relation to the indexing, later to be described, and consequently the housing 31 is arranged to be shifted from one connection to the other by means of a cam 38 mounted on a shaft 39 which is driven by the extensible shaft 40 to which it is connected by a universal connection 41. The opposite end of the extensible shaft 40 is connected by universal connection 42 to the indexing shaft 43 of the machine.

The indexing shaft 43 is mounted for rotation in a table 44 which, by virtue of bolts 45 and a cooperating channel 46, can be set in any predetermined adjusted position along the table 10 and made rigid therewith. The indexing shaft carries a segmentally toothed gear 47 having an index retaining lug 48. The teeth of the index gear 47 engage an index gear 49. The teeth of the gears 47 and 49 are preferably spiralled on a 45° pitch. Upon driving the gear 47, the teeth thereof cooperate with the teeth of the gear 49 to rotate the gear 49 a predetermined amount for each rotation of the gear 47, depending upon the number of teeth in the gear 47. The lug 48 is so arranged that as the segmental teeth have completed their rotation of the gear 49, the lug 48 enters properly positioned radial slots 50 in the gear 49, thus securing the gear firmly in indexed position until there is sufficient subsequent rotation of the gear 47 to re-engage its teeth with the gear 49.

The gear 49 is detachably secured to a chuck barrel 51 which is mounted for rotation in a suitable housing 52 which is rigid with a work table, later to be described. The barrel 51 is provided with a suitable gripping collet 53 for gripping the end of the article to be cut. The collet is released for receiving the article by a suitable hand wheel 54 mounted on a collar 55 which is in threaded engagement with the inner end of the collet, as illustrated in Fig. 1.

In order to predetermine the extent to which the article can be inserted endwise into the collet 53, an adjustable stop rod 56 is mounted in the collar 55 and is adjusted to predetermined set positions by means of a threaded portion 57 which is in engagement with internal threads in the collar 55, the stop being secured in its adjusted position by a lock nut 58.

A work table 60 is carried on the table 44 for movement therewith and with the table 10. The table 60 carries the housing 52 in which the work supporting, holding and indexing mechanism above described is mounted.

In the form illustrated, the table 60 is connected to the table 44 by means of extensions 61 on the bearings of the shaft 43, these bearings being rigidly secured in the table 44. Due to this relation of the table 60 and the shaft 43, the indexing gears maintain their cooperation in all raised and lowered positions of the table 60 and can continue to function during raising and lowering of the table 60, as desired.

In order to raise and lower the table 60 in proper relation to the timing mechanism, a rock lever having a lower arm 62 and an upper arm 63 and pivot portion 64 by which it is mounted in the table 44 is provided. The arm 63 of the rocker is connected to a suitable pivot 65, the ends of which are mounted in longitudinal slides 66. The slides 66 are movable longitudinally of the table 60 in slideways 67, arranged at the sides of the table.

A spring 68 is connected at one end to the pivot portion 65 and at the other end to a stationary anchor bolt 69 on the table 60 so that the spring continuously urges the arm 63 in a clockwise direction, thus urging the slides 66 to the extreme right in Fig. 1. The other arm 62 of the rock lever is connected to an operating arm 70 by a lost motion connection provided through the pivot 71 and a cooperating slot 72 in the arm 70. The opposite end of the arm 70 is connected to a crank 73 on the index shaft 43. Thus the arm 70 is reciprocated in accordance with the rotation of the index shaft 43. The rocking of the crank arms 62 and 63 about the pivot portion 64 raises and lowers the table 60 by causing the table to swing about the axis of the index shaft 43 in a timed relation which will later be described. Swinging of the arm 63 clockwise permits the table 60 to swing downwardly about the axis of the shaft 43.

Mounted on the table 60 is a vise, designated generally at 75, which grips and supports the opposite end of the article to be slotted, the vise being adjustable lengthwise of the table 60 by bolts 76 operating in suitable keyways in the table 60, as illustrated in Figs. 1 and 6. The vise comprises a pair of jaws 77 which are mounted for sliding movement toward and away from each other on a base 78. A screw 79 is rotatably mounted in the base 78 for moving the jaws upon rotation of the screw, as best illustrated in Fig. 6 and a hand wheel 80 is provided on the screw for rotating the same, if desired. Ordinarily, however, the rotation is effected by means of a crank lever 81 fixed at one end to the screw and at the opposite end to an extensible rod 82. The opposite end of the rod 82 is connected to the slide 66 by a suitable pivot 83. The rod 82 is so connected to the worm 79 and slide 66 that when the arm 63 is moved counterclockwise to raise the table 60, the slide 66 is moved toward the vise end of the table 60, and causes the rod 82 to exert a push on the crank 81 to rotate the screw 79 sufficiently to tighten the vise. A compression spring 84 is provided between the sections of the extensible rod 82 for affording proper closure of the vise jaws by yielding pressure so as to avoid danger of overstressing of the vise due to oversize in diameter of the articles being gripped, while at the same time assuring proper gripping of undersize diameter articles.

In order to rotate the shaft 43 to effect the indexing and lowering and lifting of the table 60, a cam 85 having operating pins 86 and 87 is rigidly affixed to the shaft 43 for rotation therewith. Adjustably mounted on a suitable arm 88 on the table 3 of the apparatus are cooperating hook cams 89 and 90. Adjustment of these cams along the arm 88 is effected by means of bolts, such as indicated at 91 in Figs. 2 and 3, and which operate in undercut keyways in the arm 88.

The cam 89 is mounted for rotation about a vertical shaft 92 and is urged by a spring 93 into a position to lie within the path of the pins 86 and 87. The cam 89 is similarly mounted on a shaft 94 and urged into the same position relative to the cam 85.

As the table 60 travels lengthwise, the cam 85 on the shaft 43 is normally in a position in which the axes of the pins define a horizontal plane parallel to the table. This position is illustrated at the left in Fig. 3 in which case the table 60 is assumed to be moving to the left on the cutting feed, the table being in the raised position. As it continues to the left, the pin 87 strikes the downwardly sloping cam surface 95 of the cam 89 and travels therealong, rotating the cam 85, lowering the table, and releasing the vise 75. This action continues until the pin 86 is raised into a position to engage a beveled rear cam face 89a (see Fig. 4) of the free end of the hooked cam 89 and swings the cam 89 forwardly so as to pass to the left thereof. In this position, the pin 86 has been swung upwardly by the final action of the lower part of the cam 95 on the pin 87 so that said pin 86 is almost vertically above the pin 87. At this time the lug 48 is still in mesh with the index gear 49 and no indexing occurs.

The rotation of the index shaft 43 to this extent rotates the cam 38 sufficiently to kick the clutch housing 31 to the left in Fig. 2, thus connecting the high speed pulley 23 to the pulley 27. Thereupon the lowered table 60 is ready to return rapidly. This same rotation of the shaft 43 has operated the arm 70 to swing the bell crank arm 63 to the right to permit the table 60 to lower and to release the vise 75. Thereupon the table starts rapidly to the right in Fig. 1 and the cam pin 86 engages the inner cam surface 96 on the free hook portion of cam 89 and as the table continues traveling to the right, this cam and the pin 86 cooperate to rotate the shaft 43 still further until the pins are again in a horizontal position with pin 87 at the right hand side in Fig. 3 and pin 86 at the left hand side. This continued rotation is during the lost motion movement of the arm 70 so that the table does not rise. The movement is also sufficient to cause the index gears to be operated two thirds of the way toward their desired index. Obviously, the passage of the pin 86 past the free end of the beveled cam 89 is permitted by the swinging outwardly of the cam 89 when the table was moving to the left, but the inner cam surface 96 of this cam is not beveled in this manner and once the pin is within the hook of the cam, it can pass out only by being swung downwardly by the surface 96 so as to pass under the free end of the hook.

Upon continued movement to the right in Fig. 3, the now leading pin 87 engages the sloping cam surface 97 of the cam 90. It rises along this surface, the pin 86 swinging downwardly and engaging the rear cam face 90a of the cam 90 and swinging the cam 90 outwardly until the pin 86 clears the free hook end and the cam swings backwardly, catching the pin 86 within the hook. The travel of the pin 87 up to the surface 97 completes the final third of the indexing, then closes the vise, disposes the lug 48 in the next slot 50 of the main gear and raises the table to sink the cutter, this latter occurring during the end of the movement of the cam 85.

When the pin 87 reaches the end of its movement along the end of the surface 97, it is disposed vertically above the pin 86 and, at this time, trips the clutch to cause the connection between the pulleys 28 and 24 to drive the table to the left for the next cut. As the table travels to the left, the pin 86 is caught by the cam surface 99 of the free end of the hook cam 90, rotating the shaft 43 until the pins 86 and 87 again occupy their original horizontal plane, whereupon the operation is repeated. During this last rotation of the cam 85, the lug 48 remains in its slot in the index gear and holds the gear in proper indexed position.

Thus the operations would be repeated indefinitely in sequence were the apparatus to continue operation.

In order to start and stop the apparatus after the complete sequence of steps necessary for providing all the preselected slots in a given article, a push button type switch 100 is used to start and stop the main driving motor. The stop button 101 of this switch is so positioned as to be engaged and operated by a rock lever 102, mounted on the casing of the switch 100, when the switch end of the rock lever 102 is pressed against the stop button 101. To effect this operation automatically, the rock lever 102 is provided with a cam surface 103 which is engaged by the end of a pin 104 on the main index gear 49 once for each revolution of the main index gear. This pin is so positioned as to operate the lever and stop the device after the completion of the last slot and lowering of the table.

To support the valve or article being slotted at a point between the chuck and vise, a work rest, such as illustrated in Fig. 7, is provided. The bridge comprises a rigid upright block of metal 105 which may be secured in desired adjusted positions along the table 60 by means of bolts 106. At its upper end the block 105 is bifurcated to provide spaced arms 107 which are widely enough separated to accommodate the stem S of the valve therebetween. Supporting screw pins 108 having hardened inner end faces for engaging and supporting the valve stem are adjustably mounted in the arms 107. The pins or screws 108 are so disposed that when three slots, arranged 120° apart, are to be machined in the valve stem, the stem can be supported by engagement of the pins 108 with the stem above the already slotted portion but below a horizontal plane through the stem axis. This affords a more rigid support than would be provided were the pins 108 to engage the stem below the two already formed slots, and consequently flexure and vibration of the stem under the downward force of the cutter are prevented.

As heretofore described, it is necessary for efficient and fast cutting that all slack be eliminated so that the valve is fed uniformly and with relatively fixed pressure against the cutter. For this purpose the slack eliminator shown herein only in Fig. 1 is provided, the slack eliminator being more fully described and claimed in my Patent 2,311,677, issued February 23, 1943. In the particular form illustrated herewith, the follower 13, which operates on the feed screw 12, is modified somewhat to provide one part of the slack eliminator. Since, in the present instance, the feed screw travels with the table 10, the follower 13 is rigidly secured to the table 3, though it is obvious that a follower might be secured to the table 10 and the worm mounted in fixed longitudinal position on the table 3, the other parts of the slack eliminator being correspondingly reversed.

In modifying the follower 13, one face 110 thereof is hardened and polished and disposed at 90° to the axis of the worm feed screw 12. Adjacent to this plane face of the follower 13 and spaced slightly therefrom is a follower 111 having a beveled hardened face 112 facing the face 110 and disposed at an angle of about 5 to 8° to the face 110. The follower 111 is constrained from rotation with the feed screw 12 by suitable guideways 113 (one shown) which may be formed in the table 3 but it is free to travel relative to the table 3 and the table 10 axially of the feed screw 12 except in so far as constrained by its internal threads engaging the threads of the feed screw 12. Spaced vertical grooves or runways, not shown herein, are provided in the face 112 and accommodate a pair of hardened ball bearings 115, these ball bearings being capable of rolling along the grooves and maintaining contact with the face 110. The followers 13 and 111 act in effect as an axially expansible thread.

I claim:

1. In a metal cutting machine, a rotatable holder for work adapted to have different angularly spaced surfaces presented to a cutter, a frame for the holder, a supporting table for the frame, a pivotal connection between the frame and table extending transversely of the work holder rotational axis for enabling swinging movement of the work toward and away from the cutter about the pivotal axis, a shaft coaxial with the pivot, means for turning the shaft, an indexing gear on the work holder, a complementary indexing gear rigid with the shaft coaxial therewith and engageable with and disengageable from the first mentioned indexing gear, said gears cooperating intermittently for turning the work holder into indexed positions upon rotation of the shaft.

2. In a metal cutting machine, a rotatable holder for work adapted to have different angularly spaced surfaces presented to a cutter, a frame for the holder, a supporting table for the frame, a guiding connection between the frame and table for enabling movement of the frame in order to carry the work toward and away from the cutter, a shaft rotatably secured to the frame transverse to the rotational axis of the holder, means for intermittently turning the shaft, an indexing worm gear mechanism connecting the shaft with the work holder and operable during a partial rotation of the shaft and inoperable during a subsequent partial rotation thereof for indexing the work, and mechanism connected with the frame and table and operatively connected to the shaft for operation thereby between indexing operations of the shaft for moving the frame on said guiding connection whereby to move the work relative to the cutter.

3. In a metal cutting machine, a rotary cutter, a rotary indexing head adapted and arranged to hold a work piece for presentation of angularly spaced surface portions thereof toward the cutter upon predetermined rotation of the head, a pivotal mounting for the head, indexing gearing including a pinion coaxial with the pivot axis and a gear on the head adapted to be driven by the pinion for indexing the work, a crank mechanism on the pinion shaft and means operatively connecting the crank mechanism and support for moving the support toward and away from the tool about the axis of said pivotal mounting upon rotation of the pinion shaft.

4. In a metal cutting machine, a rotary cutter, a rotary indexing head adapted and arranged to hold a work piece for presentation of angularly spaced surface portions thereof toward the cutter, a pivotal mounting for the head, indexing gearing including a shaft coaxial with the pivot axis, means for turning the shaft once for each cutting operation of the machine, a gear segment on the shaft, and a gear on the head adapted to be driven by the segment for indexing the work relative to the cutter during part of the single turn of the shaft, a crank mechanism on the shaft, and means operatively connecting the crank mechanism and support for moving the support toward and away from the cutter about the axis of said pivotal mounting during a different part of such single turn of the shaft.

5. In a metal cutting machine having a work cutter operating in fixed position, a rotatable holder for work adapted to have different angularly spaced surface portions presented to the cutter, a frame for the holder, a bed supporting the table, means for guiding the table on the bed for reciprocating movement transversely of the cutter axis, reciprocating means for the table, means connecting the frame and table in a manner to enable movement of the frame away from and toward the table thereby to enable movement of the work toward and away from the cutter, a shaft on the frame extending transversely of the direction of movement of the table on the bed, cam means on the shaft, cooperating cam means on the bed spaced along the table guide for intermittently rotating the shaft fractional turns during different portions of a complete reciprocation of the table, an indexing mechanism connecting the shaft with the work holder and operating to turn the work holder incident to fractional turning of the shaft, and means drivingly connected with the shaft and frame for moving the frame toward and away from the table incident to fractional turning of the shaft.

6. In a machine tool having a cutter operating on a fixed axis, a work support comprising a frame and a work rest mounted on the frame and having means for supporting a work piece in proper position for presentation to the cutter, a mounting for the frame comprising a table and elevating means connecting the frame to the table for movement transverse to the cutter axis, whereby to enable movement of the work piece toward and away from the cutter, work gripping mechanism carried on the frame, and means connected with said gripping mechanism and actuated by the elevating means while moving the frame toward the cutter to grip the work and while moving the frame away from the cutter to release the work.

7. In a machine tool having a cutter adapted for performing a cutting operation on an elongated work piece, a work support comprising a frame and a work rest mounted on the frame and having means for supporting such elongated work piece at different portions of its length, a pivotal mounting for the frame having a pivot axis transverse to the work axis, means for swinging the frame about the pivot axis in opposite directions whereby to enable movement of the work piece toward and away from the cutter, work gripping mechanism carried on the frame, and means connected with said gripping mechanism and actuated by the swinging movement of the frame about said pivot in one direction to grip the work and in the opposite direction to release the work.

8. In a machine tool having a cutter adapted for performing cutting operations on an elongated work piece longitudinally thereof, a work support comprising a frame and a work holder rotatably mounted thereon for enabling turning of the work to present different surface portions thereof to the cutter, said holder having a chuck for gripping one end portion of such work piece, a pivotal mounting for the frame having a pivot axis extending transversely of the work axis in the gripped position of the work, means for swinging the frame about the pivot axis in opposite directions whereby to enable movement of the work piece toward and away from the cutter, work gripping mechanism carried on the frame remote from said chuck, means connected with said gripping mechanism and actuated consequent upon pivotal movement of the frame in one direction to grip the work and in the opposite direction to release the work, and indexing mechanism on the frame and connected to the work holder for turning the work.

9. In a metal cutting machine, a rigid work support for elongated work pieces adapted to be presented to a cutter, means on the work support for holding the work in a predetermined position on the support, a table, a pivotal connection between the support and table on a pivotal axis extending transversely of the work axis, mechanism connecting the table and support for swinging the support toward and away from the table about said pivot axis, said mechanism including a slide member on the support generally parallel to the axis of the work in said predetermined position thereof and an arm pivoted to the table on a fixed axis relative to the table and connected to the slide member so that the slide member is moved along the support as the arm is swung to move the support, and a gripper vise for the work, mounted on the support and operatively connected to the slide member so as to grip and release the work as the slide is moved in opposite directions respectively.

10. In a metal cutting machine, an indexing head having a work gripping device rotatably mounted thereon, a spiral toothed indexing gear drivingly rigid with the gripping device, said gear having slots circumferentially spaced apart and open outwardly of the gear, a spiral toothed indexing gear segment, means supporting the segment on an axis transversely of the gear so disposed that teeth on the segment can mesh with the indexing gear, and a locking tongue on the gear segment in angularly spaced relation to the teeth of the gear segment and so disposed as to enter said slots of the gear in indexed positions thereof when the gear and segment teeth are unmeshed.

11. In a metal cutting machine, a turnable gripper for work to be cut, a supporting frame for the gripper, indexing gearing on the frame including a spiral toothed indexing gear on the gripper and a mutilated spiral toothed indexing pinion on the frame, the axis of the pinion extending at right angles to the axis of said gear and being offset therefrom in a plane parallel to the plane of the indexing gear axis and not intersecting said latter plane, a reciprocable carrier for the frame, a fixed support for the carrier, means to drive the carrier along the support, a rotary cam member rigid with the indexing pinion, and a cooperating cam means on the support, said cam member and means coacting during predetermined portions of the movement of the carrier to cause the indexing pinion to turn the indexing gear and perform an indexing operation.

12. In a metal cutting machine, a rotary work cutter, a turnably mounted work holder, a frame supporting the work holder, a reciprocable carrier for the frame to which the frame is pivoted on an axis transverse to the turning axis of the work holder so that the frame and work carried by the holder can be swung toward and away from the carrier and the cutter, a shaft on said pivot axis, indexing gearing connected with the shaft and work holder and operable upon turning of the shaft through a predetermined angle to index the work holder, mechanism connected with the shaft and frame to cause the aforesaid swinging movement of the frame upon turning of the shaft, a main support for the reciprocable carrier, means to reciprocate the carrier on the support to feed the work relative to the cutter, and cam mechanism carried in part in generally fixed position on the main support and in part by the shaft, said cam mechanism operating at one end portion of the travel of the carrier to cause the shaft to be turned a partial rotation to swing the frame and work away from the cutter and to perform part of an indexing operation, and said cam mechanism operating at the opposite end portion of the travel of the carrier to complete such indexing operation and swing the frame and work toward the cutter.

13. In a metal cutting machine, a cutting element, a work holding element, a reciprocable carriage for one of said elements, a bed for the carriage having a carriage guide thereon, driving mechanism to reciprocate the carriage, said driving mechanism including a rotary driving element which is continually drivingly connected to the carriage, a driving member coaxial with a portion of said driving element, means to turn the driving members in opposite directions at different speeds, clutch mechanism operable to couple the driving element alternately to said driving members, controlling means for the clutch mechanism partly mounted on the carriage and continually connected to the clutch mechanism by extensible universal drive shaft means for effecting reversal of drive upon actuation of the control means, and actuating means for the control means spaced apart on the bed and coacting with the control means to reverse the direction of drive at the desired limits of the stroke of the carriage.

14. In a metal cutting machine, a frame and an indexing head mounted for turning movement on the frame, a supporting table for the frame, means guidingly connecting the frame and table for movement of the frame and thereby the head away from and toward the table, a bed having a guide thereon for supporting the table and enabling the table to be moved on the bed transversely of the movement of the frame on the table, means including a reversing gearing connected to the table and operable to drive the table in opposite directions along the guide, a shaft rotatably carried by the table, frame actuating means for moving the frame toward and away from the table, indexing means connected with the indexing head for indexing the head, gear actuating means connected with the gearing for reversing the gearing, said shaft being drivingly connected to said frame actuating means, said indexing means and said gear actuating means and operating each in timed relation to each other upon predetermined turning movements of the shaft in a given direction, and means on the bed and shaft operable to effect said turning movements of the shaft incident to reciprocation of the table along the bed.

15. In a machine tool having a reciprocable carriage and a shaft transverse to carriage movement and required to be given a half turn at one end portion of a reciprocation of the carriage, a bed supporting the carriage, a pair of cam pins projecting beyond one end of the shaft and rigid therewith, 180° apart relative to the shaft axis and which, prior to turning of the shaft, lie in a common plane parallel to the path of movement of the carriage and coincident with the shaft axis; a cam pivoted on the bed on an axis perpendicular to said common plane and having a hooked cam portion positioned to engage whichever pin is turned out of said common plane, said hooked portion being swingable about the pivot axis in one direction only out of pin engaging position, yielding means normally holding the hooked portion in pin engaging position, cam means on the bed associated with the pivoted cam and positioned to engage the relatively leading pin as the carriage moves toward one end of a stroke so as to turn the shaft through such an angle that the other pin is caused to engage said hooked portion, the hooked cam portion having a beveled cam surface so disposed that said other pin pivotally displaces the hooked portion during such angular movement of the shaft and then become latched by the hooked portion, said hooked portion having a cam surface lying within the hook and arranged to move the latched cam pin into said common plane upon return movement of the carriage.

16. In a machine tool having a milling cutter adapted and arranged for cutting longitudinal radial slots in an elongated work piece of circular cross section, a work holder having means for gripping the work piece and indexing the work piece 120° at each indexing operation, and means for relatively reciprocating the work and cutter when the cutter is in contact with the work; a work supporting device in spaced relation to the gripping means along the work piece and opposite the region of operation of the cutter on the work, and rigid means on the supporting device engaging the work piece symmetrically with reference to the radial longitudinal central plane of a slot being cut in the work and at regions each less than 120° angularly removed from the slot intercepting portion of said plane about the axis of the work but more than 90° removed therefrom.

17. In a metal cutting machine having a work cutter operating in fixed position, a turnable holder for work adapted to have different angularly spaced surface portions presented to the cutter, a frame for the holder, a reciprocably movable supporting table for the frame, means for guiding the table and reciprocating it, a pivotal connection between the frame and table extending transversely of the work holder axis and in offset relation thereto whereby the work is movable toward and away from the cutter, a shaft coaxial with the pivot, means rendered operative as a result of reciprocations of the table for intermittently rotating the shaft fractional turns during different terminal portions of a complete reciprocation of the table, an indexing mechanism connecting the shaft with the work holder and operating to index the work holder during fractional turning of the shaft, and means drivingly connected with the shaft and frame for moving the frame on its pivotal mounting during fractional turning of the shaft.

18. In a machine tool having a rotatable indexing head with an indexing gear thereon provided with angularly spaced radial slots, a shaft carried by the head transverse to the axis of the indexing gear and having a gear segment thereon with teeth adapted to mesh with the gear and diametrally opposite therefrom, a gear precisioning tongue adapted to enter the slots in different indexed positions of the gear, a reciprocable carrier for the head, a support for the carrier, means to drive the carrier in opposite directions along the support, cam means drivingly rigid with shaft, and two cam members in spaced relation to each other along the support parallel to the path of movement of the carrier therealong, one cam member cooperating with the cam means of the shaft during movement of the carrier at one end of its stroke to turn the shaft and release the tongue from one slot and perform a partial indexing operation, and the other cam member cooperating with said cam means at the opposite end of such stroke to turn the shaft and complete such indexing operation and cause the tongue to engage another slot of the indexing gear.

19. In a metal cutting machine, a rotary work cutter, a turnably mounted work holder, a frame supporting the holder, a reciprocable carrier for the frame to which the frame is pivoted on an axis transverse to the turning axis of the work holder so that the frame and work carried by the holder can be swung toward and away from the carrier and the cutter, a shaft on said pivot axis, mechanism connected with the shaft and frame to cause the aforesaid swinging movement of the frame upon turning of the shaft, a main support for the reciprocable carrier, means to reciprocate the carrier on the support to feed the work relative to the cutter, and cam mechanism carried in part in fixed position on the main support and in part by the shaft, said cam mechanism operating at one end portion of the travel of the carrier to cause the shaft to be turned a partial rotation whereby to swing the frame and work away from the cutter, and said cam mechanism operating at the opposite end portion of the travel of the carrier to turn the shaft through another partial rotation and swing the frame and work toward the cutter, an index gear on the work holder and a segmental index pinion on the shaft adapted to mesh therewith during partial turning of the shaft to turn the work holder.

20. In a metal cutting machine, a frame and an indexing head mounted for turning movement on the frame, indexing mechanism connected therewith, a supporting table for the frame, means guidingly connecting the frame and table for movement of the frame and thereby the head away from and toward the table, jacking mechanism connecting the frame and table for effecting such movement of the frame, a bed having a guide thereon for supporting the table and enabling the table to be moved on the bed transversely of the movement of the frame on the table, means including a reversing gearing drivingly connected to the table and operable to drive the table in opposite directions along the guide and an actuating mechanism for reversing the driving operation of the gearing, a master operating member rotatably carried by the table on an axis extending transversely of the table movement on the bed, coacting cam means on the bed and master member, respectively, operable to turn the member incident to reciprocation of the table along the bed, and operating connections between said member and each of the aforesaid mechanisms.

ELSMERE W. McKINNEY.